United States Patent Office 3,833,526
Patented Sept. 3, 1974

3,833,526
SEMI-RIGID POLYURETHANE FOAMS FROM A MIXTURE OF OXYPROPYLATED POLYOLS
Stanley Cear and Joseph Feltzin, Wilmington, Del., assignors to ICI America Inc., Wilmington, Del.
No Drawing. Continuation-in-part of abandoned application Ser. No. 147,710, May 27, 1971. This application June 4, 1973, Ser. No. 366,331
Int. Cl. C08g 22/44
U.S. Cl. 260—2.5 AP                     13 Claims

ABSTRACT OF THE DISCLOSURE

Semi-rigid polyurethane foam compositions are provided which have excellent energy absorption and low rebound properties while retaining other desirable physical properties characteristic of semi-rigid polyurethane foams. The polyurethane foams may be prepared by reacting an an organic polyisocyanate with a polyoxypropylene ether of 2,2-bis(4-hydroxyphenyl) propane and a polyoxypropylene ether of sorbitol. Also provided are polyol compositions suitable for the preparation of cellular polyurethanes which comprise a polyoxypropylene ether of 2,2-bis(4-hydroxyphenyl) propane wherein the ether contains from 4 to 9 mols of oxypropylene per mol of ether and a polyoxypropylene ether of sorbitol containing from 30 to 55 mols of oxypropylene per mol of ether.

This application is a continuation-in-part of U.S. Patent Application Ser. No. 147,710, filed May 27, 1971, now abandoned. This invention relates to cellular polyurethane compositions and to compositions which are suitable for the preparation of polyurethanes. More particularly, this invention relates to semi-rigid polyurethane foam compositions having energy absorption characteristics and to polyol compositions which are useful for the preparation of semi-rigid polyurethane foam compositions.

Semi-rigid polyurethane foams have found extensive use in modern industrial applications where shock absorbency is important. Notwithstanding that the utilization of semi-rigid polyurethane foams in such applications has found wide spread use, semi-rigid polyurethane foams have in the past frequently exhibited disadvantageous characteristics of insufficient shock absorbency. Heretofore, all attempts to improve the properties of semi-rigid polyurethane foams have been notably unsuccessful by reason of the fact that the improvement in shock absorbency has been relatively minor or has had an adverse effect on rebound characteristics and on other desirable physical properties of semi-rigid polyurethane foams.

It is, accordingly, an object of this invention to provide novel, semi-rigid polyurethane foam compositions having advantages of shock absorbency.

It is another object of this invention to provide a semi-rigid polyurethane foam composition which exhibits excellent energy absorption properties as well as low rebound.

It is another object of this invention to provide novel compositions for producing cellular polyurethanes.

It is an object of this invention to provide cellular polyurethane compositions which have excellent energy absorption properties and slow volume recovery properties.

It is another object of this invention to provide novel polyol compositions which are suitable for the preparation of semi-rigid polyurethane foam compositions having advantages of energy absorption.

The foregoing objects and still further objects of this invention are broadly accomplished by providing semi-rigid polyurethane foam compositions which have substantially 100% volume recovery in not less than 5 seconds after release of the deflection or compression load when, at 23° C., a cube of the foam measuring 5 centimeters by 5 centimeters by 2.5 centimeters is compressed by about 50% of its thickness, held in this compressed position for 5 seconds and then released. Throughout this speciffication and appended claims, the volume recovery characteristics of the semi-rigid foams of this invention are determined in accordance with ASTM Test Method D-1564-69, except that the foam is deflected to 50±1% of its thickness (Procedure 16.3) and except that the deflected foam is held in the deflected or compressed position for 5 seconds instead of 22 hours (Procedures 16.4), hereinafter referred to as Modified ASTM Test Method D-1564-69.

The polyurethane foams provided in accordance with this invention are semi-rigid foams as distinguished from flexible foams and rigid foams. Flexible foams have almost instant recovery when compressed and released whereas rigid foams break when compressed and do not recover at all. In contrast, the semi-rigid foams of this invention do not break when compressed by about 50% of their volume, and when held in this compressed state for about 5 seconds and then released, recover to their original volume in not less than 5 seconds after the compression load is released. The maximum length of time required for volume recovery of the foams is not material in distinguishing these semi-rigid foams of this invention from flexible foams and rigid foams. However, the foams of this invention usually recover in less than one hour and preferably in less than 5 minutes. In addition to the abovedescribed volume recovery characteristics, a preferred class of polyurethane foams of this invention have the following properties as determined by the designated ASTM Test Method: elongation of 75% to 175% and preferably from 110% to 150% (ASTM D-1564-60); density of 2 to 20 pounds per cubic foot and preferably from 3 to 10 pounds per cubic foot (ASTM D-1564-69); at least 90% open cells (ASTM D-2856-70); and a ball rebound of less than 15% (ASTM D-1564-69). A particularly preferred class of polyurethane foams of this invention have the following properties: a percent relaxation of at least 45% as determined according to ASTM D-1564-71 Suffix D and using the equation Percent Relaxation equals Initial Stress minus Final Stress divided by Initial Stress times one hundred; a secant modulus of at least 1.5 as determined according to ASTM D-1564-71 Suffix D; and a minimum PSI of at least 0.45 as determined according to as ASTM D-1564-71 Suffix D.

The cellular polyurethane compositions of this invention may be prepared by reacting at least one polyoxypropylene ether of 2,2'-bis(4-hydroxyphenyl) propane containing from 4 to 9 oxypropylene groups per 2,2'-bis(4-hydroxyphenyl) propane moiety and at least one polyoxypropylene ether of sorbitol containing from 30 to 55 oxypropylene groups per sorbitol moiety with at least one organic polyisocyanate. The polyurethanes of this invention are preferably prepared according to the so-called "one-shot" method which comprises reacting the aromatic isocyanate with a mixture of polyoxypropylene ether of 2,2'-bis(4-hydroxyphenyl) propane and polyoxypropylene ether of sorbitol. If desired, however, the cellular polyurethane compositions may be prepared by the "prepolymer" method which comprises sequentially reacting the organic aromatic polyisocyanate, polyoxypropylene ether of 2,2'-bis(4-hydroxyphenyl) propane and polyoxypropylene ether of sorbitol.

The polyoxypropylene ethers which may be used to prepare the semi-rigid polyurethane foam compositions of this invention are known, and they may be prepared in any suitable manner conventional in the prior art. For example, the polyoxyalkylene ethers of 2,2'-bis(4-hydroxyphenyl) propane may be prepared by condensing one molar proportion of 2,2'-bis(4-hydroxyphenyl) propane with from 4 to 9 molar proportions of propylene oxide. In a similar manner, the polyoxypropylene ethers of sorbitol may be prepared by condensing one molar proportion of sorbitol with from 30 to 55 molar proportions of propylene oxide. A preferred class of polyoxypropylene ethers of 2,2'-bis(4-hydroxyphenyl) propane useful in the preparation are those ethers containing from 5 to 7 molar proportions of oxypropylene per mol of ether. A particularly preferred ether within this class is polyoxypropylene(6) 2,2'-bis(4-hydroxyphenyl) propane. A preferred class of polyoxyalkylene ethers of sorbitol useful in this invention are those containing from 45 to 50 molar proportions of oxypropylene groups per mol of ether. A particularly preferred polyoxypropylene ether of sorbitol is polyoxypropylene (47) sorbitol.

A wide variety of organic polyisocyanates may be used to prepare the semi-rigid polyurethane foam reaction products of this invention. In general, any polyisocyanate which is conventionally used in the prior art for the preparation of polyurethane foams may be used to prepare the polyurethane foams of this invention. Illustrative examples of such polyisocyanates include tolylene diisocyanate; phenylene diisocyanate; methylene bis(4-phenylisocyanate); 4-chloro-1,3-phenylene diisocyanate; 1,5-naphthalene diisocyanate; 4,4'-diphenylene diisocyanate; 1,5 - tetrahydronaphthalene diisocyanate; hexamethylene polyphenyl polyisocyanate (PAPI); diphenylmethane diisocyanate; Isonate 143L diisocyanate (a liquid diisocyanate structurally similar to diphenylmethane diisocyanate, available from the Upjohn Company); xylene diisocyanate; ethylene diisocyanate; tolylene triisocyanate; and diphenylether triisocyanate. Arylene diisocyanates, that is, those in which each of the two isocyanate groups is attached directly to an aromatic ring, are preferred. A particularly preferred arylene diisocyanate is tolylene diisocyanate.

The relative amounts of polyoxypropylene 2,2'-bis(4-hydroxyphenyl) propane, polyoxypropylene sorbitol, and polyisocyanate which are used to prepare the semi-rigid polyurethane foam compositions of this invention may vary over a broad range, and the particular amounts chosen will depend, largely, on the specific intended use of the semi-rigid polyurethane foam composition. In general, satisfactory results may be obtained where the reactants are used in amounts such that the overall ratio of isocyanate group to hydroxyl group is from 0.8 to 1.2, with a preferred range for said ratio about 1.0 to about 1.1, and the weight ratio of polyoxypropylene 2,2'-bis(4-hydroxyphenyl) propane to polyoxypropylene sorbitol is from about 0.4 to about 1 and preferably from about 0.5 to about 0.8.

The above-described methods of preparing the cellular polyurethanes of this invention may be carried out in the presence of a foaming agent and in the added presence, whenever desired, of various accelerators or catalyst, fillers, colorants, emulsifiers, and dispersants, as is well known in the art.

Catalysts which may be used in the preparation of polyurethane foams of the present invention may comprise, for example, amine catalysts, tin catalysts and mixtures thereof. Among the suitable amine catalysts are n-alkyl morpholines such as n-methyl morpholine and n-ethyl morpholine; tertiary amines such as trimethylamine, triethylamine, tetramethylamine guanidine, triethylene diamine, N,N,N',N'-tetramethyl-1,3-butylenediamine; piperazine and piperazine derivatives, such as n-methyl piperazine. A preferred catalyst is DABCO LV–33, a blend of 33 parts of 1,4-diazobicyclo(2.2)octane and 67 parts of dipropylene glycol. These amines are generally present in amounts from about 0.05% to about 2% by weight of the hydroxyl-bearing compounds reacted with the isocyanate compound. Among the suitable tin catalysts are included dialkyl tin laurates, such as dibutyl tin dilaurate, dibutyl tin diacetate, stannous oleate, and stannous octylate. Tin catalysts may be used in most foams in amounts from about 0.1% to about 1% by weight of the hydroxyl-bearing compounds used in the reaction.

Examples of useful surface active agents which may be used to prepare the cellular polyurethanes are water-soluble siloxane-oxyalkylene block copolymers as described in U.S. Pat. No. 2,834,748; condensates of ethylene oxide with a hydrophobic base formed by condensing propylene oxide with a propylene glycol; alkylene oxide adducts of ethylene diamine; and polyoxyalkylene esters of long chain fatty acids and sorbitan, such as polyoxyethylene(20) sorbitan monolaurate, polyoxyethylene(4) sorbitan monolaurate, polyoxyethylene(20) sorbitan tristearate, polyoxyethylene(20) sorbitan monooleate, polyoxyethylene(5) sorbitan monooleate, and polyoxyethylene(20) sorbitan trioleate. The amount of surface active agent generally used is from about 0.5% to about 2% by weight based on the weight of hydroxyl-containing components used to prepare the cellular polyurethane.

The polyurethane foams of this invention may be prepared in the presence of any foaming agent generally used in the art for the preparation of polyurethane foams. Illustrative examples of suitable foaming agents include carbon dioxide (produced by the in situ reaction of water and polyisocyanate), halogenated saturated aliphatic hydrocarbons, and mixtures thereof. Specific examples of halogenated saturated aliphatic hydrocarbons include trichlorofluoromethane (Freon 11); monochloroethane; monochloromonofluoroethane; 1,2 - dibromo-1,1,2,2-tetrafluoroethane; 1,1,2-trichloro-1,2,2-trifluoroethane; 1,1,2,2-tetrafluoro-1,2-dichloroethane; 1,2 - difluoro-1,1,2,2-tetrachloroethane; dichloromethane; dibromomethane; and mixtures thereof. The amount of foaming agent employed in the preparation of polyurethane foams of this invention will depend on the nature of the foaming agent used and on the desired density of the foam. In general, satisfactory results may be obtained with the use of up to 10% by weight of halogenated saturated aliphatic hydrocarbon and from 0.1% to 1.2%, preferably from 0.2% to 0.8%, by weight of water, based on the total foam formulation. It will be understood, of course, that amounts of foam agents outside of these ranges may also be used when desirable.

The following examples are illustrative of compositions which are useful as the polyol component for preparing the cellular polyurethane compositions of this invention. These examples are set forth solely for the purpose of illustration and any specific enumeration of details contained therein should not be interpreted as expressing limitations of this invention. It will be readily apparent to those skilled in the art that other compositions may be prepared by substituting other hydroxyl-containing materials for those recited in the following examples.

EXAMPLE 1

Ingredients: Grams
Polyoxypropylene(47) sorbitol _____ 60
Polyoxypropylene(6) 2,2' - bis(4-hydroxyphenyl) propane _____ 40

EXAMPLE 2

Ingredients: Grams
Polyoxypropylene(45) sorbitol _____ 70
Polyoxypropylene(5) 2,2' - bis(4-hydroxyphenyl) propane _____ 30

EXAMPLE 3

Ingredients: Grams
Polyoxypropylene(50) sorbitol _____ 50
Polyoxypropylene(7) 2,2' - bis(4-hydroxyphenyl) propane _____ 50

EXAMPLE 4

Ingredients: Grams
Polyoxypropylene(30) sorbitol _____ 60
Polyoxypropylene(6) bisphenol A _____ 40

EXAMPLE 5

Ingredients: Grams
- Polyoxypropylene(47) sorbitol _____ 65
- Polyoxypropylene(4) 2,2'-bis(4-hydroxyphenyl) propane _____ 35

EXAMPLE 6

Ingredients: Grams
- Polyoxypropylene(47) sorbitol _____ 55
- Polyoxypropylene(9) 2,2'-bis(4-hydroxyphenyl) propane _____ 45

The following is a preferred example of the preparation of a semi-rigid cellular polyurethane composition as provided in accordance with this invention.

EXAMPLE 7

Component A: Weight (Grams)
- Tolylene diisocyanate _____ 23.2

Component B:
- Polyoxypropylene(47) sorbitol _____ 42
- Polyoxypropylene(6) 2,2'-bis(4-hydroxyphenyl) propane _____ 28
- Stannous octoate _____ 0.1
- Dabco LV-33 (Blend of 33 parts of 1,4-diazobicyclo(2.2)octane and 67 parts of dipropylene glycol _____ 0.5
- Organo silicone surfactant _____ 5.5
- Water _____ 0.7

Component B in the above formulation is prepared by adding each of the named ingredients sequentially in the amounts specified while mixing thoroughly with a high speed mixer. To Component B is then added the specified amount of organic isocyanate (Component A) and the resulting mixture is stirred at high speed for 10 seconds with a high speed mixer, after which it is then poured into a one gallon paper cup. Within about 8 seconds the foam begins to rise and after about 100 seconds the foaming is complete. The semi-rigid polyethane foam composition produced by this procedure may be found to have the following characteristics:

Physical Properties:
- Density—5.5 pounds per cubic foot
- Tensile Strength, p.s.i.—25.3
- Elongation—121%
- Rebound, percent of height—9.0
- Compression Set (4 days, 100° F.—100% R.H.)—2.7%

The semi-rigid polyurethane foam compositions of the following illustrative examples are prepared according to the procedure of Example 7. Numbered examples are illustrative examples of polyurethane foam compositions of this invention. Lettered examples are presented for purpose of comparison.

EXAMPLE 8

Component A: Grams
- Tolylene Diisocyanate _____ 20

Component B:
- Polyoxypropylene(47) sorbitol _____ 44.16
- Polyoxypropylene(6) 2,2'-bis(4-hydroxyphenyl) propane _____ 29.44
- Stannous octoate _____ 0.1
- Dabco LV-33 _____ 0.5
- Organo silicone surfactant _____ 5.5
- Water _____ 0.3

Physical Properties:
- Density—9.1 pounds per cubic foot
- Tensile Strength, p.s.i.—21.5
- Elongation—113%
- Rebound, percent of height—7.0
- Compression Set (4 days, 100° F.—100% R.H.)—1.6%

EXAMPLE 9

Component A: Grams
- Tolylene Diisocyanate _____ 18.6

Component B:
- Polyoxypropylene(47) sorbitol _____ 45.12
- Polyoxypropylene(6) 2,2'-bis(4-hydroxyphenyl propane _____ 30.08
- Dabco LV-33 _____ 0.5
- Stannous octoate _____ 0.1
- Organo silicone surfactant _____ 5.5
- Water _____ 0.1

Physical properties:
- Density—17.5 pounds per cubic foot
- Tensile Strength, p.s.i.—30.6
- Elongation—92%
- Rebound, percent of height—3%
- Compression Set (4 days, 100° F.—100% R.H.)—1.3%

EXAMPLE 10

Component A: Grams
- Tolylene diisocyanate _____ 24.7

Component B:
- Polyoxypropylene(47) sorbitol _____ 40.3
- Polyoxypropylene(5) 2,2'-bis(4-hydroxyphenyl) propane _____ 26.8
- Dimethylethanolamine _____ 1.5
- Organo silicone surfactant _____ 6.0
- Water _____ 0.7

Physical properties:
- Density—3.9 pounds per cubic foot
- Tensile Strength, p.s.i.—25.1
- Elongation—145.0%
- Ball rebound—11%
- Open cells—93.7%

EXAMPLE 11

Component A: Grams
- Tolylene Diisocyanate _____ 24.9

Component B:
- Polyoxypropylene(30) sorbitol _____ 40.1
- Polyoxypropylene(9) 2,2'-bis(4-hydroxyphenyl) propane _____ 26.7
- Dimethylethanolamine _____ 1.5
- Organo silicone surfactant _____ 6.0
- Water _____ 0.75

Physical properties:
- Density—4.2 pounds per cubic foot
- Tensile Strength, p.s.i.—14.1
- Elongation—98.0%
- Ball rebound—12%
- Open cells—94.4%

EXAMPLE 12

Component A: Grams
- Tolylene Diisocyanate _____ 22.1

Component B:
- Polyoxypropylene(47) sorbitol _____ 39.8
- Polyoxypropylene(6) 2,2'-bis(4-hydroxyphenyl) propane _____ 26.5
- Dimethylethanolamine _____ 1.5
- Organo silicone surfactant _____ 6.75
- Water _____ 0.4
- Freon R-11-B _____ 3.0

EXAMPLE 13

Component A: Grams
- Tolylene Diisocyanate _____ 20.8

Component B:
- Polyoxypropylene(47) sorbitol _____ 38.2
- Polyoxypropylene(6) 2,2'-bis(4-hydroxyphenyl) propane _____ 25.5
- Dimethylethanolamine _____ 1.5
- Organo silicone surfactant _____ 6.75
- Water _____ 0.2
- Freon R-11-B _____ 7.0

EXAMPLE 14

Component A:  Grams
    Tolylene Diisocyanate _____ 21.1
Component B:
    Polyoxypropylene(47) sorbitol _____ 36.4
    Polyoxypropylene(6) 2,2'-bis(4 - hydroxyphenyl) propane _____ 24.2
    Dimethylethanolamine _____ 1.5
    Organo silicone surfactant _____ 6.75
    Freon R-11-B _____ 10.0

EXAMPLE 15

Component A:  Grams
    Tolylene Diisocyanate _____ 24.05
Component B:
    Polyoxypropylene(47) sorbitol _____ 40.62
    Polyoxypropylene(6) 2,2'-bis(4-hydroxyphenyl) propane _____ 27.08
    Organo silicone surfactant _____ 6.0
    Dimethylethanolamine _____ 1.5
    Water _____ 0.75

EXAMPLE A

Component A:  Grams
    Tolylene Diisocyanate _____ 20.93
Component B:
    Polyoxypropylene(70) sorbitol _____ 41.8
    Polyoxypropylene(6) 2,2'-bis(4-hydroxyphenyl) propane _____ 27.9
    Organo silicone surfactant _____ 6.0
    Dimethylethanolamine _____ 1.5
    Water _____ 0.75

EXAMPLE B

Component A:  Grams
    Tolylene Diisocyanate _____ 22.07
Component B:
    Polyoxypropylene(100) sorbitol _____ 42.5
    Polyoxypropylene(6) 2,2'-bis(4-hydroxyphenyl) propane _____ 28.3
    Organo silicone surfactant _____ 6.0
    Dimethylethanolamine _____ 1.5
    Water _____ 0.75

EXAMPLE C

Component A:  Grams
    Tolylene Diisocyanate _____ 15.86
Component B:
    Polyoxypropylene ether of glycerine (Molecular Weight of 3,000) _____ 82.2
    Organo silicone surfactant _____ 2.0
    Tin Catalyst _____ 0.25
    Amine Catalyst (Dabco 33 LV) _____ 0.8
    Water _____ 0.9

Table I gives the maximum p.s.i., secant modulus, percent relaxation, and recovery properties for the polyurethane foam compositions of Examples 15, A, B, and C. These properties were all measured according to ASTM D-1564-71 Suffix D Compression Load Deflection Test. The percent relaxation was calculated according to the following equation:

$$\text{Percent relaxation} = \frac{\text{Initial Stress} - \text{Final Stress}}{\text{Initial Stress}} \times 100$$

TABLE I

| Example number | Number of oxypropylene groups [1] | Time in seconds for 95% recovery | Percent relaxation | Secant modulus | Maximum, p.s.i. |
| --- | --- | --- | --- | --- | --- |
| 15 | 47 | 18.5 | 57 | 2.07 | 0.52 |
| A | 70 | 6.0 | 39 | 1.19 | 0.29 |
| B | 100 | 8.5 | 43 | 1.03 | 0.26 |
| C | ([2]) | 1.0 | 4.4 | 2.23 | 0.54 |

[1] Number of polyoxypropylene groups present in the polyoxypropylene ethers of sorbitol used.
[2] Polyoxypropylene ether of glycerine having molecular weight of 3,000.

The recovery times show that the foam of Example 15 takes more than twice as long to recover from compression than do the foams of Examples A and B. The flexible foam of Example C shows almost immediate recovery. The percent relaxation data indicate that the foam of Example 15 adjusts to a load to a considerably greater extent than do the foams of Examples A, B, and C. The secant modulus and maximum p.s.i. data indicate that the foam of Example 15 resists deformation under immediate loading considerably better than the foam of Examples A and B. The flexible foam of Example C shows substantially the same secant modulus and maximum p.s.i. as the foam of Example 15, but the percent relaxation and recovery time are considerably different. It is apparent therefore from the comparative data recited in Table I that the polyurethane foam of Example 15 has a better capacity for resisting deformation; that is, taking up shock and accommodating itself to the stress afterwards than do polyurethane foams A, B, and C. The data also show that there is no rebound characteristic with the foam of Example 15 as is shown by the flexible foam of Example C.

The polyurethane foams of this invention may be employed in applications wherein shock absorbency is desired. Illustrative examples of such applications include crash padding, mattresses, ski boots, hospital supplies, ejection seats for aircraft, vibration damping means, engine mounts, safety padding in the interiors of cars, cushions, furniture, body protection means including athletic equipment such as gloves, knee pads, elbow pads, padding in helments, shoulder pads, hip pads, and baseball chest protectors and shin protectors.

The polyurethane foam compositions of this invention may also contain suitable compounding agents. The amount and type of compounding agent to be incorporated is dependent upon the particular use for which the polyurethane foam is intended. The compounding agents ordinarily used in the polyurethane foam industry are useful with the products of this invention. Illustrative examples of these compounding agents include fillers, plasticizers, colorants, and surfactants.

Although this invention has been described with reference to specific materials and formulations, including specific isocyanates and polyethers, it will be apparent that still other different and equivalent materials and formulations may be substituted for those described all within the spirit and scope of this invention.

Having described the invention, what is desired to be secured by Letters Patent is:

1. A semi-rigid polyurethane foam composition which is characterized by having a percent relaxation of at least 45%, a secant modulus of at least 1.5, a maximum p.s.i. of at least 0.45, and a substantially 100% volume recovery in not less than 5 seconds after release of the compression load when, at 23° C., a cube of the foam measuring 5 centimeters by 5 centimeters by 2.5 centimeters is compressed by about 50% of its thickness, held in this compressed position for about 5 seconds, and then released, and which comprises a polyurethane reaction product of an aromatic polyisocyanate and a polyoxypropylene ether of 2,2'-bis(4-hydroxylphenyl)propane containing from 4 to 9 equivalents of oxypropylene per mol of ether and a polyoxypropylene ether of sorbitol containing from 30 to 55 equivalents of oxypropylene per mol of ether, wherein the ratio of isocyanate groups to hydroxyl groups is from 0.8 to 1.2, wherein the weight ratio of polyoxypropylene ether of 2,2'-bis(4-hydroxyphenyl)propane to polyoxypropylene ether sorbitol is from 0.4 to about 1. and wherein the reaction is carried out in the presence of a foaming agent.

2. A semi-rigid polyurethane foam composition of Claim 1 characterized by having substantially 100% volume recovery in less than one hour after release of the compression load, an elongation of 75% to 175%, a density of 2 to 20 pounds per cubic foot, at least 90% open cells, and a ball rebound of less than 15%.

3. A semi-rigid polyurethane foam composition of Claim 2 characterized by having substantially 100% volume recovery within a period of less than 5 minutes after release of the compression load, an elongation of 110% to 150%, a density of 3 to 10 pounds per cubic foot, at least 90% open cells, and a ball rebound of less than 15%.

4. A semi-rigid polyurethane foam composition of Claim 3 wherein the polyol mixture comprises a polyoxypropylene ether of 2,2'-bis(4-hydroxyphenyl)propane containing from 5 to 7 equivalents of oxypropylene per mol of ether and a polyoxypropylene ether of sorbitol containing from 45 to 50 equivalents of oxypropylene per mol of ether, wherein the ratio of isocyanate groups to hydroxyl groups is about 1 and wherein the weight ratio of polyoxypropylene 2,2'-bis(4-hydroxyphenyl)propane to polyoxypropylene sorbitol is from about 0.5 to about 0.8.

5. A semi-rigid polyurethane foam composition of Claim 4 wherein the polyol mixture comprises a mixture of polyoxypropylene (6) 2,2'-bis(4-hydroxyphenyl)propane and polyoxypropylene(47 sorbitol.

6. A composition suitable for the preparation of semi-rigid cellular polyurethane which comprises a mixture of a polyoxypropylene ether of 2,2'-bis(4-hydroxyphenyl)propane containing from 4 to 9 equivalents of oxypropylene per mol of ether and a polyoxypropylene ether of sorbitol containing from 30 to 55 equivalents of oxypropylene per mol of ether wherein the weight ratio of polyoxypropylene ether of 2,2'-bis(4-hydroxyphenyl)propane to polyoxypropylene ether of sorbitol is from about 0.4 to about 1.

7. A composition of Claim 6 wherein the polyoxypropylene ether of sorbitol contains from 45 to 50 equivalents of oxypropylene per mol of ether.

8. A composition of Claim 6 wherein the polyoxypropylene ether of 2,2'-bis(4-hydroxyphenyl)propane contains from 5 to 7 equivalents of oxypropylene per mol of ether.

9. A composition of Claim 8 wherein the polyoxypropylene ether of sorbitol contains from 45 to 50 equivalents of oxypropylene per mol of ether.

10. A composition of Claim 6 wherein the said weight ratio is from about 0.5 to about 0.8.

11. A composition of Claim 10 wherein the polyoxypropylene ether of 2,2'-bis(4-hydroxyphenyl)propane contains from 5 to 7 equivalents of oxypropylene per mol of ether and the polyoxypropylene ether of sorbitol contains from 45 to 50 equivalents of oxypropylene per mol of ether.

12. A composition of Claim 11 comprising a mixture of polyoxypropylene(6) 2,2'-bis(4-hydroxyphenyl)propane and polyoxypropylene(47) sorbitol.

13. A composition of Claim 12 wherein the said mixture contains about 40 parts by weight of the polyoxypropylene(6) 2,2'-bis(4 - hydroxyphenyl)propane and about 60 parts by weight of polyoxypropylene(47) sorbitol.

References Cited
UNITED STATES PATENTS

| | | | |
|---|---|---|---|
| 3,265,641 | 8/1966 | Wismer et al. | 260—2.5 |
| 3,558,529 | 1/1971 | Whitman et al. | 260—2.5 |
| 3,215,652 | 11/1965 | Kaplan | 260—2.5 |
| 3,728,288 | 4/1973 | Cobbs, Jr. et al. | 260—2.5 |

M. J. WELSH, Primary Examiner

E. C. RZUCIDLO, Assistant Examiner

U.S. Cl. X.R.

252—182; 260—2.5 AC, 2.5 AS